No. 664,080. Patented Dec. 18, 1900.
H. GEISENHÖNER.
MOTOR SWITCH.
(Application filed May 4, 1899.)
(No Model.) 2 Sheets—Sheet 1.

WITNESSES.
A. H. Abell.
A. F. Macdonald

INVENTOR.
Henry Geisenhöner,
by Albert G. Davis
Atty.

THE NORRIS PETERS CO., PHOTO-LITHO., WASHINGTON, D. C.

No. 664,080. Patented Dec. 18, 1900.
H. GEISENHÖNER.
MOTOR SWITCH.
(Application filed May 4, 1899.)

(No Model.) 2 Sheets—Sheet 2.

WITNESSES.
A. H. Abell.
A. F. Macdonald

INVENTOR.
Henry Geisenhöner,
by Albert G. Davis
Atty.

UNITED STATES PATENT OFFICE.

HENRY GEISENHÖNER, OF SCHENECTADY, NEW YORK, ASSIGNOR TO THE GENERAL ELECTRIC COMPANY, OF NEW YORK.

MOTOR-SWITCH.

SPECIFICATION forming part of Letters Patent No. 664,080, dated December 18, 1900.

Application filed May 4, 1899. Serial No. 715,531. (No model.)

*To all whom it may concern:*

Be it known that I, HENRY GEISENHÖNER, a citizen of the United States, residing at Schenectady, county of Schenectady, State of New York, have invented certain new and useful Improvements in Motor-Switches, (Case No. 484,) of which the following is a specification.

This invention relates to starting switches or controllers for electric motors, one object being to render it impossible for an operator to injure the motor or blow the circuit-fuses by careless or ignorant manipulation of the switches.

A further object is to reduce sparking at the switch-contacts and to provide for the automatic rupture of the motor-circuits upon extraordinary variations in the current conditions of the circuit.

In carrying out the invention I connect in the motor-circuit a switch controlled by a single operating-handle, a movement of which performs all the necessary changes in the circuit connections to cut in the motor through a variable resistance, and thereby gradually admit current in starting, and then short-circuit the rheostat and prevent heating the parts. I provide also an electromagnetic detaining device for permitting the spring acting upon the switch to reopen the circuit when current abnormally increases or decreases.

My invention therefore comprises a motor-switch by which the motor is cut into circuit through a rheostat and then a short circuit provided for the latter and a single controlling-handle for accomplishing these functions in the order stated on cutting in the motor and rupturing the circuit through both devices simultaneously.

It comprises also other features in an organization of this character more or less specific, which will be hereinafter more fully described and claimed.

It comprises also an arrangement of the switch-controlling contacts by which the arc at the moment of circuit rupture is greatly reduced.

It comprises also in a switch of the general character outlined above an automatic releasing device, as will be hereinafter more fully set forth.

Figure 1:
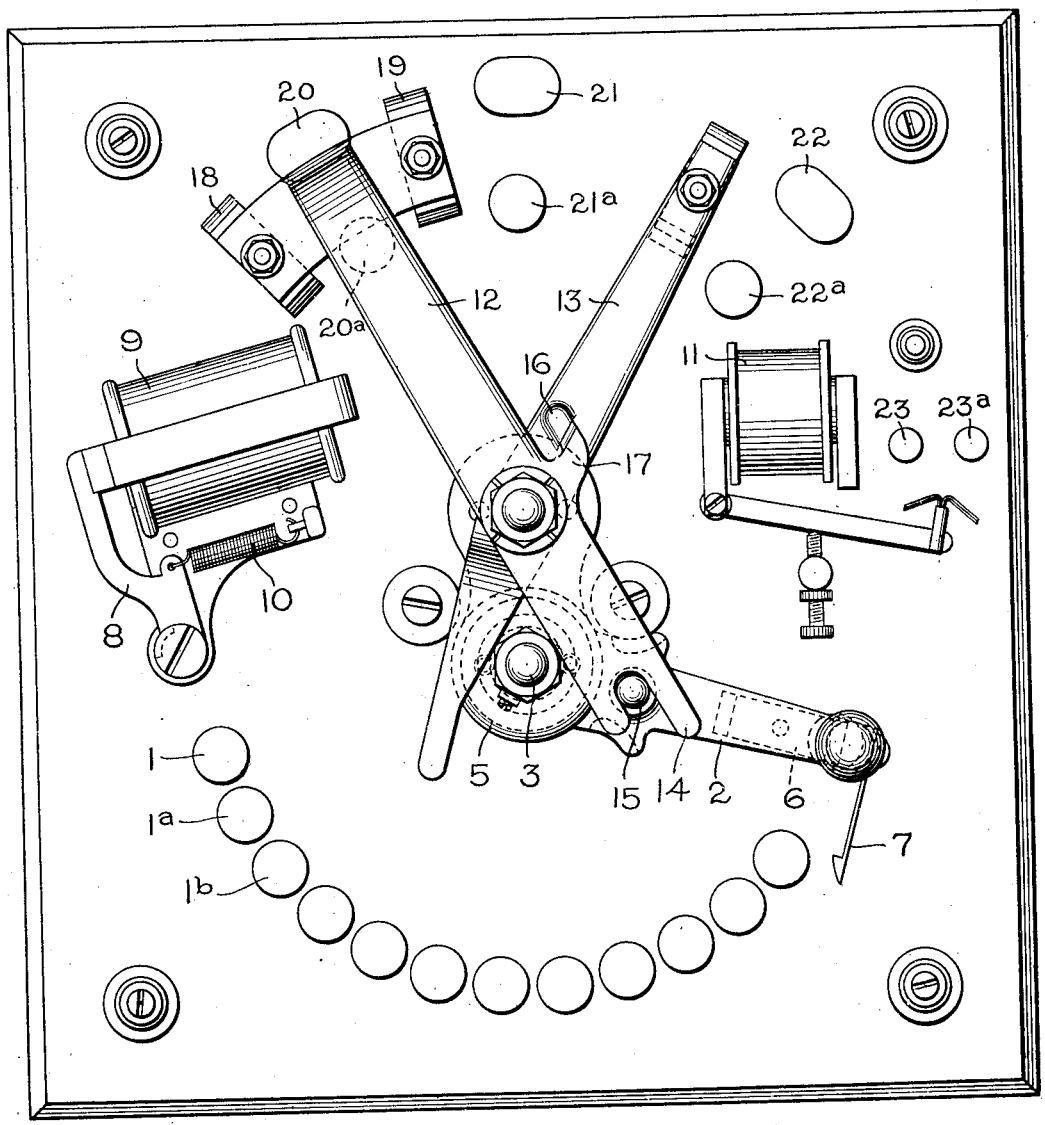
Figure 2:
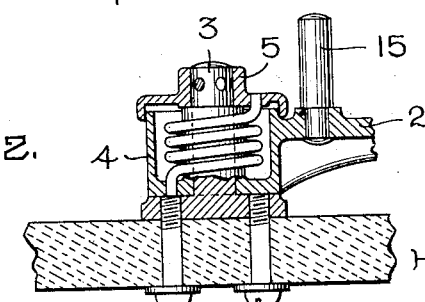
Figures 3, 4:
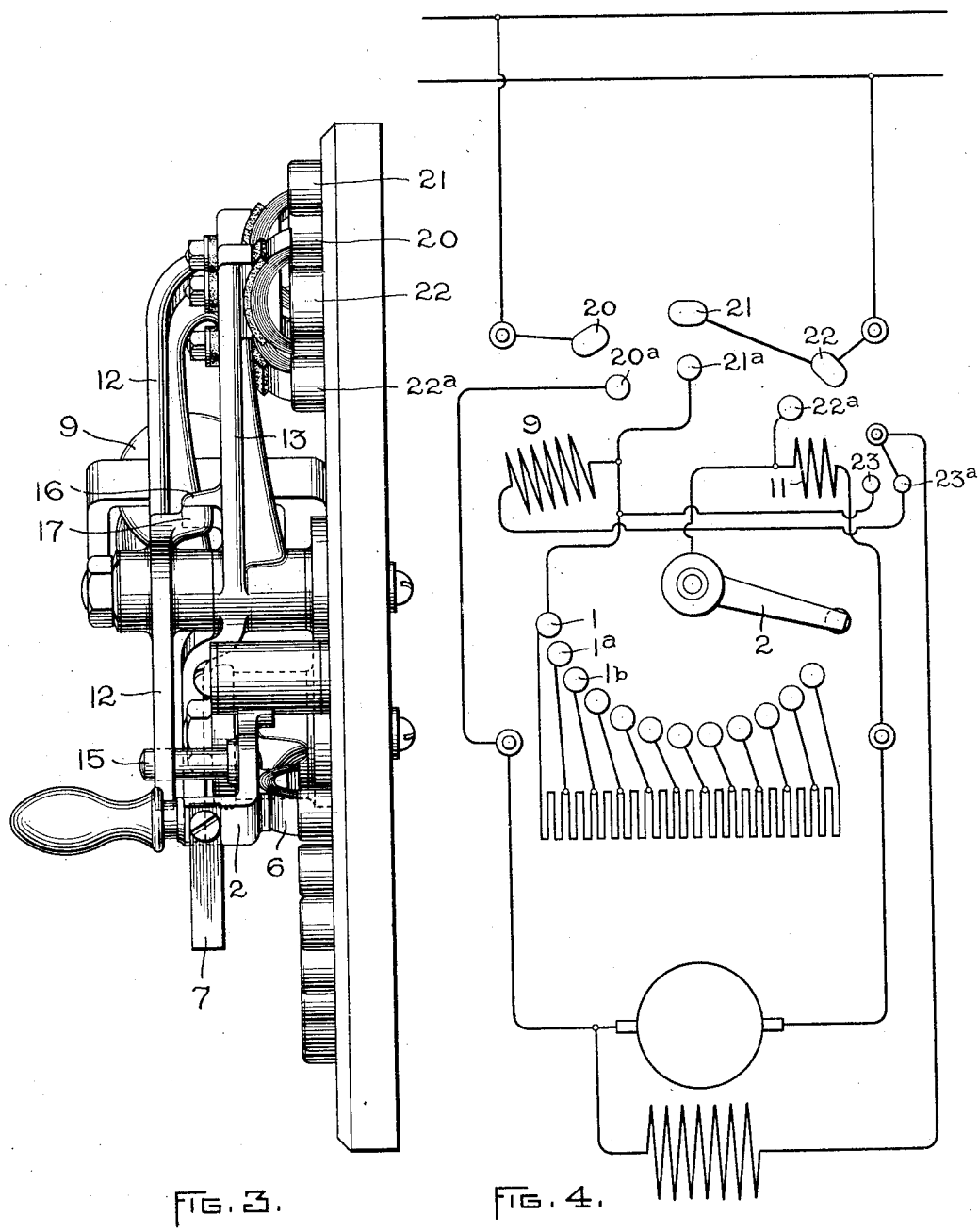

In the accompanying drawings, which illustrate the invention, Figure 1 is a top plan view of a motor-starting device provided with my improvements. Fig. 2 is a detail view of part of the operating-lever. Fig. 3 is a side elevation, and Fig. 4 is a diagram illustrating the circuit connections.

Referring first to Figs. 1, 2, and 3, 1, 1$^a$, and 1$^b$ represent a range of contacts connecting with the rheostat and mounted upon a suitable base-plate of insulating and fireproof material—such, for example, as slate.

2 is a controlling-lever provided with a handle on its free end by which it may be manipulated. The latter is journaled on a stud 3, secured to the base-plate, and is provided with a hollow hub 4, (see Fig. 2,) to which is fastened one end of a coil-spring, the other end of which is fastened to a cap 5, secured by a set-screw to the stud 3. On the under side of the lever 2 is a brush-contact formed of a bundle of thin phosphor-bronze or copper laminæ, which makes an efficient contact with the contact-studs of the rheostat. A hook or detent 7 is carried on the outer end of the operating-lever 2 and coöperates with a notch formed in the axis of the armature 8 of an electromagnet 9. The armature is given a normal bias toward the magnet by a light coil-spring 10, the tension of which is overcome, of course, by the spring which controls the handle 6 when the hook 7 engages the armature. The magnet 9 is wound so that with a normal flow of current it will hold up the armature against the tension of the spring, but upon a predetermined decrease of current strength will release its armature and permit the controlling-lever 2 to be automatically retracted by its controlling-spring and the circuit opened. An auxiliary controlling-magnet 11 serves to release the switch upon an overload of the motor, as will be seen more clearly in the description of the diagram of circuit connections shown in Fig. 4.

The operating-handle is so related to the circuit-closing devices that in cutting in the motor it passes first over the range of rheostat-contacts and then operates a supplemental contact which short-circuits the rheostat. The parts are so constructed also that in opening the circuit the short-circuiting contact is not disturbed until the rheostat has been cut in, when the circuit is broken upon both contacts simultaneously. Various organizations of apparatus for accomplishing these results may be provided, and I do not limit myself to the specific form shown in the drawings. This, however, is a convenient embodiment of my invention. It comprises two switch-levers 12 and 13, mounted upon a common axis and both coöperating with the operating-handle and with one another. The lever 12 is provided with two points of engagement with the stud 15 on the operating-lever, the organization shown being a recess formed in the end of the lever by which two prongs are provided, one of which, as shown at 14, is longer than the other, so that in the movement of the lever which cuts out the motor the longer prong will permit the stud to engage the lever in the position where the circuit had been closed by the forward movement when the stud passed out of the recess and receded from the shorter prong. The path of movement of the stud 15 also intercepts an arm or projection on the short-circuiting lever 13, so that after the circuit has been made and the resistance cut out by the movement of the lever 12 the lever 13 is operated and the rheostat short-circuited.

In the backward movement of the handle the lever 13 is left *in statu quo*, so as to preserve the short circuit until the stud 15 engages the prong 14, when two confronting or abutting lugs 16 and 17, carried by or mounted upon the respective levers, come into engagement, and the circuit is opened at all points of contact simultaneously. The lever 12 is provided with an arm of insulating material, on which are mounted laminated brushes 18 and 19, adapted to bridge the contacts 20 20ª and 21 21ª. Similarly the lever 13 is provided with a brush to bridge the contacts 22 and 22ª.

The circuit connections will be more clearly understood upon consideration of Fig. 4. The contacts 20 20ª connect one circuit-lead with one motor-terminal. A shunt type of motor is shown in the diagram, though the invention is applicable to motors of any type. The underload circuit-breaking coil 9 is shown in series with the field-winding and the overload-coil 11 in the armature branch. The armature of the latter bridges two contacts 23 and 23ª, by which coil 9 is short-circuited and its armature therefore released, so that upon a definite increase of current strength the armature of the magnet 11 is lifted and the coil 9 demagnetized, thereby opening the circuit automatically. The studs 16 and 17 are so related to the operating-handle that when the motor-circuit is opened the brushes 18 and 19 of lever 12 and the brush on lever 13 will leave their contacts simultaneously, this breaking the circuit of the motor at two points—that is, by way of the short circuit and through the rheostat—thus greatly reducing the arcing at the points of contact.

It will thus be seen that by the organization herein described but a single manual operation is necessary in order to cut in or out the motor and to make all the necessary changes in the circuit connections to promote an efficient control of the motor. As commonly organized several independent switches are necessary to be operated, and through ignorance or mistake a wrong order of connection may produce serious damage to the motor or may cause serious annoyance by blowing the circuit-fuses at points more or less distant from the spot where the motor-switch is located.

What I claim as new, and desire to secure by Letters Patent of the United States, is—

1. A motor-switch comprising two circuit-controlling devices, one connecting a rheostat in circuit and the other adapted to short-circuit the same, an operating-handle common to both devices, and means for operating the devices in sequence in starting the motor and simultaneously in cutting out the motor.

2. A motor-switch comprising two switch-levers capable of independent movement, one adapted to close the motor-circuit through a rheostat, and the other to short-circuit the rheostat, an operating-handle common to both, and means for automatically changing their order of engagement with the operating-handle when cutting the motor into and out of circuit, respectively.

3. A motor-switch comprising a circuit-closer for cutting in the motor, a rheostat controlled thereby, a short-circuiting contact closed by the circuit-closing lever after the rheostat has been cut out, and means for disconnecting the lever and short-circuiting device in cutting out the motor until the moment of circuit rupture.

4. A motor-switch comprising two pivoted circuit-controlling levers, one closing the circuit through a rheostat, the other closing a short circuit around the rheostat, and an operating-handle common to both and engaging them in the order stated when cutting in the motor, the levers being provided with engaging surfaces adapted to abut only on opening the circuit.

5. A motor-switch comprising two circuit-controlling levers, as 12 and 13, journaled on the same axis, one closing the circuit through a rheostat, the other closing a short circuit around a rheostat, an operating-handle common to both, a stud, 15, on said handle, the lever 12 having a forked extremity, as described, coöperating with said stud, and lugs, as 16 and 17, adapted to engage on the rearward movement of the handle.

6. A motor-switch comprising a spring-actuated lever carrying contact devices for making the motor-circuit, a rheostat, contacts actuated by the lever for graduating the current in different order and by a different number of graduating steps on closing and opening the circuit respectively, a detaining device holding the switch when set, and means for automatically releasing the switch upon a determinate variation of current strength.

7. A motor-switch comprising a spring-actuated switch-lever controlling the motor-circuit through a rheostat, two circuit-closing levers controlled thereby, one governing the rheostat-circuit, and the other a short circuit around the rheostat, a detent for holding the switch when set, and electromagnetic releasing mechanism for disengaging the detent upon a definite variation in current flow.

8. A motor-switch comprising an operating-handle, a switch-lever controlled thereby and operating a double-pole break in the motor-circuit, a rheostat included in the motor-circuit by said switch, a short circuit around the rheostat controlled by a continued movement of the operating-handle, and connections for opening both the short circuit and the double-pole closure simultaneously.

In witness whereof I have hereunto set my hand this 2d day of May, 1899.

HENRY GEISENHÖNER.

Witnesses:
BENJAMIN B. HULL,
MABEL E. JACOBSON.